Feb. 26, 1924.
W. J. THOMAS
AUTOMATIC TIRE PUMP
Filed Oct. 12, 1922
1,484,914
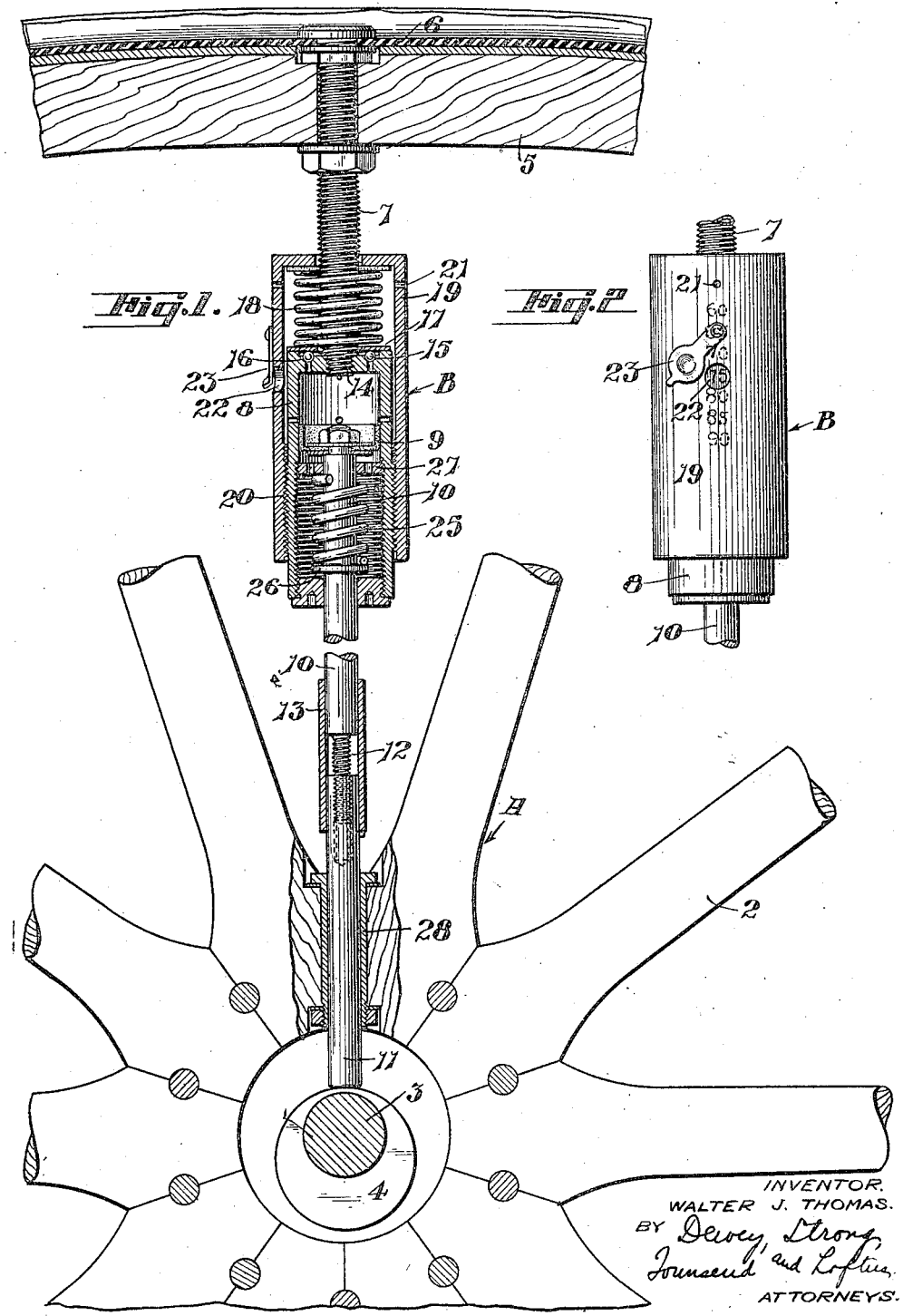
INVENTOR.
WALTER J. THOMAS.
BY Dewey Strong,
Townsend and Loftus,
ATTORNEYS.

Patented Feb. 26, 1924.

1,484,914

UNITED STATES PATENT OFFICE.

WALTER J. THOMAS, OF MODESTO, CALIFORNIA, ASSIGNOR OF ONE-FOURTH TO JOHN A. WENGER, OF MODESTO, CALIFORNIA.

AUTOMATIC TIRE PUMP.

Application filed October 12, 1922. Serial No. 594,177.

*To all whom it may concern:*

Be it known that I, WALTER J. THOMAS, a citizen of the United States, residing at Modesto, county of Stanislaus, and State of California, have invented new and useful Improvements in an Automatic Tire Pump, of which the following is a specification.

This invention relates to pneumatic tires such as used on automobiles and the like, and more particularly to a pump carried by the wheel and actuated thereby, whereby any predetermined pressure desired may be maintained in the tire.

The object of the present invention is to generally improve and simplify devices of the character described; to provide a pumping unit which may be readily attached to any standard wheel now in use; to provide means whereby a reciprocal movement will be automatically imparted to the pump during turning movement of the wheel; and further to provide an adjustable relief valve whereby the air will be by-passed when a desired predetermined pressure is obtained in the tire. Other objects will hereinafter appear.

One form which my invention may assume is exemplified in the following description and illustrated in the accompanying drawings, in which—

Fig. 1 is a sectional broken away view of an automobile wheel, showing the application of the invention.

Fig. 2 is a side elevation of the pump.

Referring to the drawings in detail, A indicates the hub of an automobile wheel, 2 the spokes, 3 the spindle about which the wheel rotates, 4 a stationary cam on the spindle, 5 the felloe of the wheel, 6 the inner tube of a pneumatic tire, and 7 the tire valve. Disposed intermediate the tire valve and the hub of the wheel is a pumping unit generally indicated at B. The pumping unit consists of a cylinder 8 in which is mounted a piston 9. The piston is secured on the upper end of a rod which is made in two sections as indicated at 10 and 11. These sections are connected by a threaded coupling 12, whereby the clearance of the piston with relation to the head of the cylinder may be increased or decreased, and whereby the rod sections may be uncoupled when installing or removing the pumping unit. The coupling 12 is normally covered by a sleeve 13 frictionally or otherwise secured and as such may be either raised or lowered when the coupling is being adjusted or uncoupled.

The cylinder proper indicated at 8 is closed at the upper end and is provided with a centrally threaded opening 14, whereby a connection is made with the pneumatic tire valve 7. The head of the cylinder is otherwise provided with one or more ball checks, such as indicated at 15, which are held against seats 16 by means of a ring or washer 17 and a spring 18. The tension of this spring may be adjusted by an exterior cap or cylinder 19. This cylinder has a threaded connection with relation to the cylinder 8, as shown at 20, and vertical adjustment of the cylinder 19 is thus permitted. This vertical adjustment increases or decreases the tension of the spring 18 and as such determines the pressure under which the ball checks operate. The cylinder or cap 19 is also provided with one or more vents as shown at 21, through which air is freely admitted, and it is furthermore provided with a reading opening 22 normally covered by a plate 23. One side of the cylinder 8 is graduated, as indicated at 24, and these graduations may be viewed through the opening 22 when the plate 23 is swung to one side as shown in Fig. 2. That is if it is desired to maintain a pressure of seventy-five pounds in the tire, the cylinder 19 is turned until the opening 23 registers with the graduation marked seventy-five. This graduation is so positioned that the tension of spring 18 will retain the ball checks in closed position until this pressure is reached. Any excess pressure will then lift the ball checks and the air will be by-passed and thus permitted to escape; this being important as the pressure in the tire might otherwise become excessive. The piston 9 is reciprocated during the rotation of the wheel as the spindle 3 and the cam 4 are stationary. The cam forces the rod sections 10 and 11 outwardly and a spring 25 returns the piston and rod. This spring is located in the lower end of the cylinder 8 and is interposed between a collar 26 secured on the rod section 10, and an adjustable nut 27 positioned interior of the cylinder.

In actual operation if it is desired to install a pumping unit such as here shown in an ordinary automobile wheel, it is only necessary to drill a hole through the hub of the wheel, between two of the spokes as shown in Fig. 1, and to line this hole with a sleeve or bushing as shown at 28. The cam is then applied to the spindle and is secured thereto in any suitable manner. The cylinder 8 is then connected to the valve stem 7 by screwing it on the outer end thereof and the lower rod section 11 is finally inserted and connected by means of the coupling 12. The cylinder cap 19 is then turned until the reading opening 22 registers with the numeral indicating the pressure desired, and when this adjustment has been made, the device is ready for operation and will automatically maintain the pressure indicated when the automobile is travelling. That is each revolution of the wheel will impart one reciprocal movement to the piston 9, air being admitted to the cylinder through perforations 29 during each suction stroke. This air is compressed during the outward stroke of the piston and as such will pass through the valve 7 into the inner tube. When the pressure in the inner tube reaches a predetermined or desired pressure, for instance seventy-five pounds, the ball checks 15 will begin to relieve the pressure and permit the air to by-pass, but if the pressure in the tube should drop, due to a small leak or puncture, it is obvious that the ball checks will become inoperative and the air will again enter through valve 7. The entire device is automatic in operation and requires no attention or care once installed and adjusted. A small amount of lubricant may be injected through the openings 21 from time to time, but it is hardly required as a cup leather is employed on the piston.

If a fairly high pressure is required in the tire and it is found that the clearance between the piston and the head of the cylinder is too great it is possible to decrease the clearance, and thereby increase the pressure of the pump by adjusting the screw coupling indicated at 12. Again, if it is desired to remove the pumping unit for inspection, repair, or otherwise, it is quickly and readily accomplished as it is only necessary to disconnect the coupling 12 and unscrew the cylinder with relation to the tire valve 7. The pumping unit here illustrated is installed on each wheel, and each tire is therefore taken care of and the necessity of running any distance on a flat tire is avoided in most instances, and the life and general riding qualities of the tire should therefore be materially improved.

While certain features of the present invention are more or less specifically illustrated, I wish it understood that various changes in form and proportion may be resorted to within the scope of the appended claims, similarly that the materials and finish of the several parts employed may be such as the experience and judgment of the manufacturer may dictate or various uses may demand.

Having thus described my invention, what I claim and desire to secure by Letters Patent is—

1. In a device of the character described a cylinder, a piston reciprocally mounted therein, a head member forming a closure for one end of the cylinder, a threaded discharge opening in said head member, a perforation in the head member having a seat formed at one end thereof, a ball valve engageable with the seat, a washer engageable with the ball valve, a cap carried by the cylinder and vertically adjustable with relation to the washer, and a spring interposed between the washer and the cap, said spring, washer and ball valve being enclosed by the cap.

2. In a device of the character described, a cylinder, a piston reciprocally mounted therein, a head member forming a closure for one end of the cylinder, a threaded discharge opening in said head member, a perforation in the head member having a seat formed at one end thereof, a ball valve engageable with the seat, a washer engageable with the ball valve, a cap carried by the cylinder and vertically adjustable with relation to the washer, a spring interposed between the washer and the cap, said spring, washer and ball valve being enclosed by the cap, a graduated scale on one side of the cylinder, and a reading opening formed in the cap adapted to register with said scale.

3. In a device of the character described a cylinder, a piston reciprocally mounted therein, a head member forming a closure for one end of the cylinder, a threaded discharge opening in said head member, a perforation in the head member having a seat formed at one end thereof, a ball valve engageable with the seat, a washer engageable with the ball valve, a cap carried by the cylinder and vertically adjustable with relation to the washer, a spring interposed between the washer and the cap, said spring, washer and ball valve being enclosed by the cap, an adjustable nut in the cylinder through which the rod extends, a collar on the rod, and a spring interposed between the adjustable nut and the collar.

4. In a device of the character described a pumping unit comprising a cylinder, a head member forming a closure for one end of the cylinder and having a discharge opening formed therein, a thread formed on the exterior of the cylinder, a cap engaging the thread and forming an exterior cover for the cylinder, a plurality of ball checks carried by the cylinder head and in communication with the interior of the cylinder, a washer engaging said ball checks and a spring interposed between the cap and said washer.

WALTER J. THOMAS.